US011949069B2

(12) United States Patent
Moganty et al.

(10) Patent No.: US 11,949,069 B2
(45) Date of Patent: Apr. 2, 2024

(54) LITHIUM ION BATTERY ELECTROLYTE ADDITIVE

(71) Applicant: NOHMS Technologies, Inc., Rochester, NY (US)

(72) Inventors: Surya S. Moganty, Henrietta, NY (US); Rutvik Vaidya, Rochester, NY (US); Gabriel Torres, Rochester, NY (US); Yue Wu, West Henrietta, NY (US); John Sinicropi, Rochester, NY (US)

(73) Assignee: NOHMs Technologies, Inc., Rochester, NY (US)

( * ) Notice: Subject to any disclaimer, the term of this patent is extended or adjusted under 35 U.S.C. 154(b) by 125 days.

(21) Appl. No.: 17/489,146

(22) Filed: Sep. 29, 2021

(65) Prior Publication Data

US 2022/0109187 A1    Apr. 7, 2022

Related U.S. Application Data

(60) Provisional application No. 63/086,943, filed on Oct. 2, 2020.

(51) Int. Cl.
*H01M 10/0567* (2010.01)
*C07F 9/17* (2006.01)
(Continued)

(52) U.S. Cl.
CPC ........... *H01M 10/0567* (2013.01); *C07F 9/17* (2013.01); *H01G 9/2009* (2013.01); *H01G 11/46* (2013.01); *H01G 11/50* (2013.01); *H01G 11/60* (2013.01); *H01G 11/62* (2013.01); *H01G 11/64* (2013.01); *H01M 4/366* (2013.01); *H01M 4/386* (2013.01); *H01M 4/624* (2013.01);
(Continued)

(58) Field of Classification Search
CPC .. H01M 10/0567; H01M 4/366; H01M 4/386; H01M 4/624; H01M 10/0525; H01M 10/4235; H01M 2300/0025; H01M 10/052; H01M 10/054; H01M 10/0569; C07F 9/17; C07F 9/173; C07F 9/18; C07F 9/1651; H01G 9/2009; H01G 11/46; H01G 11/50; H01G 11/60; H01G 11/62; H01G 11/64; H01G 11/52; H01G 11/06; Y02E 10/542; Y02E 60/10
See application file for complete search history.

(56) References Cited

U.S. PATENT DOCUMENTS

| 7,494,746 | B2 * | 2/2009 | Tarnopolsky | ..... | H01M 10/0525 |
| | | | | | 429/188 |
| 8,945,776 | B2 * | 2/2015 | Kim | .................. | H01M 10/0567 |
| | | | | | 429/327 |

(Continued)

OTHER PUBLICATIONS

International Search Report and Written Opinion for International Patent Application No. PCT/US21/53190 (dated Dec. 28, 2021).

*Primary Examiner* — Daniel S Gatewood
(74) *Attorney, Agent, or Firm* — Cozen O'Connor

(57) ABSTRACT

An electrolyte additive containing a silyl-group compound useful for reducing battery resistance and improving high-temperature performance; an electrolyte containing the silyl-group compound additive; and an electrochemical energy storage device containing the electrolyte are disclosed.

38 Claims, 3 Drawing Sheets

(51) Int. Cl.
    *H01G 9/20*          (2006.01)
    *H01G 11/46*        (2013.01)
    *H01G 11/50*        (2013.01)
    *H01G 11/52*        (2013.01)
    *H01G 11/60*        (2013.01)
    *H01G 11/62*        (2013.01)
    *H01G 11/64*        (2013.01)
    *H01M 4/36*         (2006.01)
    *H01M 4/38*         (2006.01)
    *H01M 4/62*         (2006.01)
    *H01M 10/0525*    (2010.01)
    *H01M 10/42*       (2006.01)

(52) U.S. Cl.
    CPC ... *H01M 10/0525* (2013.01); *H01M 10/4235* (2013.01); *H01G 11/52* (2013.01); *H01M 2300/0025* (2013.01)

(56) References Cited

U.S. PATENT DOCUMENTS

| | | | | |
|---|---|---|---|---|
| 8,993,158 B2* | 3/2015 | Kobayashi | ............ | C07F 19/005 |
| | | | | 429/188 |
| 2002/0009635 A1* | 1/2002 | Michot | ............... | H01M 10/052 |
| | | | | 429/188 |
| 2015/0207176 A1* | 7/2015 | Moganty | ................ | H01B 1/122 |
| | | | | 429/188 |
| 2017/0170522 A1* | 6/2017 | Moganty | ........... | H01M 10/0525 |
| 2018/0342767 A1* | 11/2018 | Ahn | .................... | H01M 10/058 |

* cited by examiner

LITHIUM ION BATTERY ELECTROLYTE ADDITIVE

CROSS REFERENCE

This application claims the benefit of the filing date of U.S. Provisional Patent Application No. 63/086,943, filed Oct. 2, 2020, which is hereby incorporated by reference in its entirety.

FIELD

The present disclosure relates to a silyl group containing thiophosphoric and phosphoric acid derivative additive that is useful for reducing battery resistance, improve high-temperature performance, and an electrolyte containing the silyl group containing triphosphoric and phosphoric acid derivative additive suitable for use in electrochemical energy storage devices.

BACKGROUND

Li-ion batteries are heavily used in consumer electronics, electric vehicles (EVs), as well as energy storage systems (ESS) and smart grids. Recently, Li-ion batteries with voltages above 4.35 V have gained importance because of higher capacity and subsequently energy density benefits. However, the stability of the cathode materials at these potentials reduces due to increased oxidation. This may result in electrochemical oxidation of the material to produce gases, and that can deteriorate the performance of the battery. The cathode active material, which is capable of intercalating/deintercalating lithium ions may dissolve in the non-aqueous electrolyte, resulting in a structural breakdown of the material, and will lead to an increase in the interfacial resistance. When these Li-ion batteries are exposed to extreme temperatures during their operation, the SEI (Solid Electrolyte Interface) layer formed on the anode is gradually broken down, and hence leads to more irreversible reactions resulting in capacity loss. These reactions happen on the positive and negative electrode during cycling but are generally more severe at higher voltages. The next generation Li-ion batteries used in consumer electronics, EVs, and ESS will require significant improvements in the electrolyte component relative to the current state-of-the art of Li-ion batteries.

The shuttling of positive and negative ions between the battery electrodes is the main function of the electrolyte. Historically, researchers have focused on developing battery electrodes, and electrolyte development has been limited. Traditional Li-ion batteries used carbonate-based electrolytes with a large electrochemical window, that can transport lithium ions. These electrolytes need functional additives to passivate the anode and form a stable SEI layer. Charging battery materials to higher voltages leads to increased capacity values, leading to higher energy density in battery packs and modules.

As the industry moves towards higher energy cathode materials for higher energy batteries, stable, efficient, and safe cycling of batteries in wide voltage windows is necessary. Li-ion battery electrolytes can be tuned based on their applications by addition of different co-solvents and additives. This tunability has enabled the development of different additives for high voltage stability and safety of Li-ion cells. Development of electrolyte additives that allow for safe operation of Li-ion cells at high voltages is critical to enable these high energy density batteries and battery packs.

Herein, thiophosphate ester compounds with silyl containing groups are reported as additives for Li-ion batteries. Molecules with the said functional groups as electrolyte additives allow for safe and stable operation of Li-ion cells, particularly in high voltage cells. The silyl-based additive materials have high solubility in organic solvents. The electrolyte with these silyl-based additives has high ionic conductivity and are suitable for use as electrolytes for electrochemical devices, particularly lithium ion batteries.

U.S. Pat. No. 8,993,158 B2 to Mitsui has reported the use of silyl ester groups containing phosphonic acid derivatives in lithium-ion battery electrolytes. U.S. Pat. No. 7,494,746 B2 and U.S. Pat. No. 8,945,776 B2 to Samsung SDI has reported the use of silyl ester group containing phosphites and borates in lithium-ion battery electrolytes. Hence, there is a need to incorporate novel additives to improve the performance of lithium-ion batteries.

SUMMARY

In accordance with one aspect of the present disclosure, there is provided an electrolyte for an electrochemical energy storage device, the electrolyte includes: a silyl-based compound additive; an aprotic organic solvent system; a metal salt; and at least one additional additive.

In accordance with another aspect of the present disclosure, there is provided an electrolyte for an electrochemical energy storage device, the electrolyte includes: a silyl-based compound additive; an aprotic organic solvent system; a metal salt; and additional additives; wherein the silyl-based compound additive has at least one phosphorus-sulfur bond.

In accordance with another aspect of the present disclosure, there is provided an electrolyte for an electrochemical energy storage device, the electrolyte includes: a silyl-based compound additive; an aprotic organic solvent system; a metal salt; and additional additives; wherein the aprotic organic solvent comprises of open-chain or cyclic carbonate, carboxylic acid ester, nitrile, ether, sulfone, sulfoxide, ketone, lactone, dioxolane, glyme, crown ether, siloxane, phosphoric acid ester, phosphite, mono- or polyphosphazene or mixtures thereof.

In accordance with another aspect of the present disclosure, there is provided an electrolyte for an electrochemical energy storage device, the electrolyte includes: a silyl-based compound additive; an aprotic organic solvent; a metal salt; and additional additives; wherein the cation of the metal salt is aluminum, magnesium or an alkali metal, such as lithium or sodium.

In accordance with another aspect of the present disclosure, there is provided an electrolyte for an electrochemical energy storage device, the electrolyte includes: a silyl-based compound additive; an aprotic organic solvent; a metal salt; and additional additives; wherein the second additive contains a compound containing at least one unsaturated carbon-carbon bond, carboxylic acid anhydrides, sulfur-containing compounds, phosphorus-containing compounds, boron-containing compounds, silicon-containing compounds or mixtures thereof.

These and other aspects of the present disclosure will become apparent upon a review of the following detailed description and the claims appended thereto.

DETAILED DESCRIPTION

Figure 1:
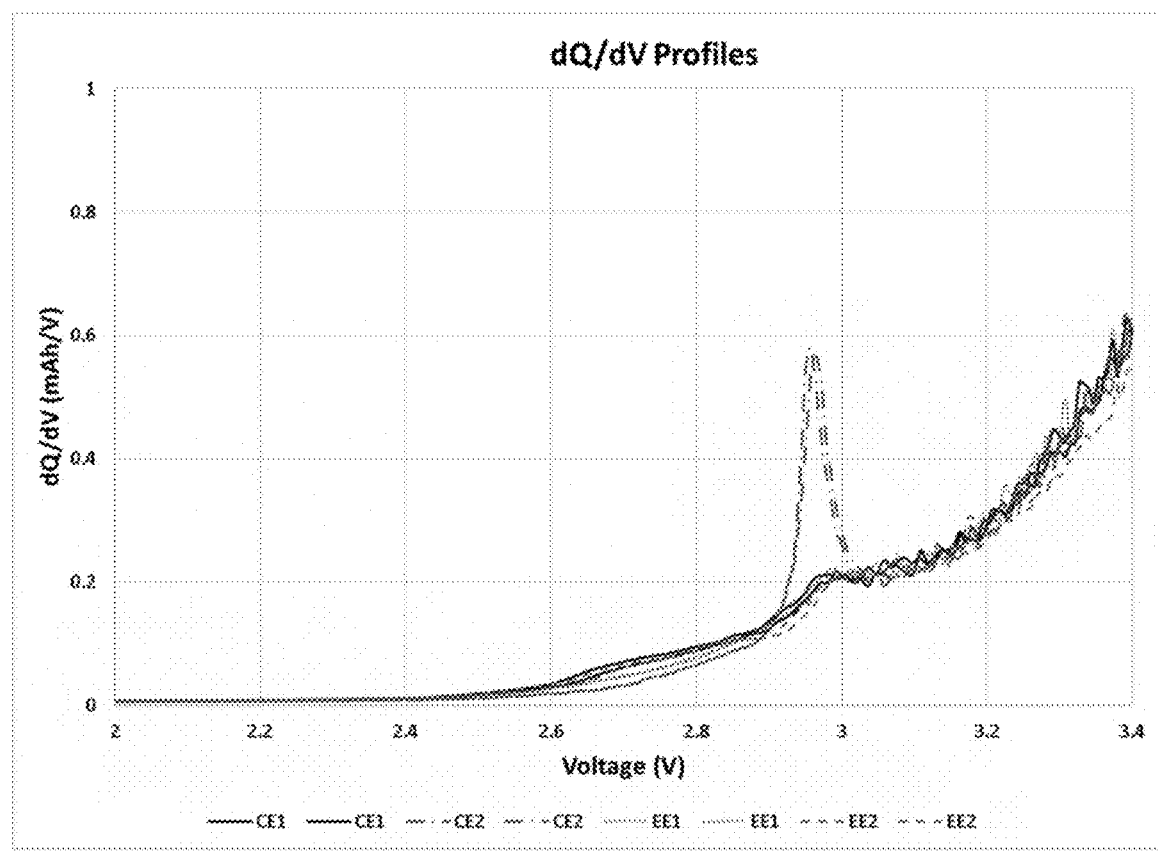
FIG. 1 shows the dQ/dV profiles of electrolytes tested in 200 mAh NMC622-Gr cells.

The disclosed technology relates generally to lithium-ion (Li-ion) battery electrolytes. Particularly, the disclosure is directed towards silyl-based compound additives, electrolytes containing these additive materials, and electrochemical energy storage devices containing the electrolytes.

The present disclosure describes a Li-ion battery electrolyte with an electrolyte additive that can improve the high voltage stability challenges in Li-ion batteries. There is a need to develop an electrolyte solution for cycling of Li-ion cells with high voltage cathodes at different temperatures. The proposed technology is based on an innovative electrolyte additive containing a silyl group, that can improve the stability of high-voltage cathode during operation in a wide temperature range. The electrolyte additives form a unique solid electrolyte interface (SEI) even when used at low weight loadings.

In an embodiment, an electrochemical energy storage device electrolyte includes a) an aprotic organic solvent system; b) a metal salt; c) a silyl-based additive material and d) additional additives.

In an aspect of the disclosure, the molecular structure of at least one silyl-based additive is depicted below:

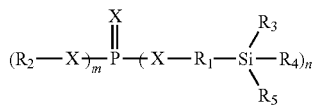

wherein:

X is independently oxygen or sulfur, wherein at least one X is sulfur;

m and n are either 0, 1, 2 or 3, wherein m and n must sum equal to 3;

$R_1$ and $R_2$ are independently selected from $C_1$-$C_{12}$ substituted or unsubstituted alkyl groups, or $C_6$-$C_{14}$ aryl groups; wherein the hydrogen atoms can be unsubstituted or can be a halogen, alkyl, alkoxy, perfluorinated alkyl, silyl, siloxy, silane, sulfoxide, amide, azo, ether, and thioether group or combinations thereof; and $R_3$, $R_4$, $R_5$ are independently selected from hydrogen, $C_1$-$C_{12}$ alkyl, heteroalkyl groups, perfluoroalkyl, alkenyl, alkynyl, phenyl or alkoxy groups.

By adding silyl moieties in the Li-ion battery system, a more stable silicon-containing film, or layer could be formed more easily on the electrode materials. Silyl-based groups in the compounds can improve the performance of conventional electrolytes by facilitate the decomposition of additives.

The disclosure also includes a method for synthesizing the silyl groups containing thiophosphoric and phosphoric acid derivatives, and the use of such molecules in lithium-ion battery electrolytes. These molecules impart greater stability to the electrolytes at higher operating voltages in a wide temperature window.

In an aspect of the disclosure, the electrolyte further includes a lithium salt in a range of from 10% to 30% by weight. A variety of lithium salts may be used, including, for example, Li(AsF$_6$); Li(PF$_6$); Li(CF$_3$CO$_2$); Li(C$_2$F$_5$CO$_2$); Li(CF$_3$SO$_3$); Li[N(CP$_3$SO$_2$)$_2$]; Li[C(CF$_3$SO$_2$)$_3$]; Li[N(SO$_2$C$_2$F$_5$)$_2$]; Li(ClO$_4$); Li(BF$_4$); Li(PO$_2$F$_2$); Li[PF$_2$(C$_2$O$_4$)$_2$]; Li[PF$_4$C$_2$O$_4$]; lithium alkyl fluorophosphates; Li[B(C$_2$O$_4$)$_2$]; Li[BF$_2$C$_2$O$_4$]; Li$_2$[Bi$_2$Z$_{12-j}$H$_j$]; or a mixture of any two or more thereof, wherein Z is independent at each occurrence a halogen, j is an integer from 0 to 12.

In an aspect of the disclosure, the electrolyte further includes an aprotic organic solvent system selected from open-chain or cyclic carbonate, carboxylic acid ester, nitrite, ether, sulfone, sulfoxide, ketone, lactone, dioxolane, glyme, crown ether, siloxane, phosphoric acid ester, phosphite, mono- or polyphosphazene or mixtures thereof in a range of from 60% to 90% by weight.

Examples of aprotic solvents for generating electrolytes include but are not limited to dimethyl carbonate, ethyl methyl carbonate, diethyl carbonate, methyl propyl carbonate, ethyl propyl carbonate, dipropyl carbonate, propylene carbonate, ethylene carbonate, fluoroethylene carbonate, bis (trifluoroethyl) carbonate, bis(pentafluoropropyl) carbonate, trifluoroethyl methyl carbonate, pentafluoroethyl methyl carbonate, heptafluoropropyl methyl carbonate, perfluorobutyl methyl carbonate, trifluoroethyl ethyl carbonate, pentafluoroethyl ethyl carbonate, heptafluoropropyl ethyl carbonate, perfluorobutyl ethyl carbonate, etc., fluorinated oligomers, methyl propionate, ethyl propionate, butyl propionate, dimethoxyethane, triglyme, dimethylvinylene carbonate, tetraethyleneglycol, dimethyl ether, polyethylene glycols, triphenyl phosphate, tributyl phosphate, hexafluorocyclotriphosphazene, 2-Ethoxy-2,4,4,6,6-pentafluoro-1,3,5,2-5,4-5,6-5 triazatriphosphinine, triphenyl phosphite, sulfolane, dimethyl sulfoxide, ethyl methyl sulfone, ethylvinyl sulfone, allyl methyl sulfone, divinyl sulfone, fluorophynelmethyl sulfone and gamma-butyrolactone.

In an aspect of the disclosure, the electrolytes further include at least one additional additive to protect the electrodes and electrolyte from degradation. Thus, electrolytes of the present technology may include a passivation additive that is reduced or polymerized on the surface of an electrode to form a passivation film on the surface of the electrode. In some embodiments, electrolytes of the present technology further include mixtures of the two types of additives.

In an embodiment, the additional additive is a substituted or unsubstituted linear, branched, or cyclic hydrocarbon including at least one oxygen atom and at least one aryl, alkenyl or alkynyl group. The passivating film formed from such additives may also be formed from a substituted aryl compound or a substituted or unsubstituted heteroaryl compound where the additive includes at least one oxygen atom.

Representative additives include glyoxal bis(diallyl acetal), tetra(ethylene glycol) divinyl ether, 1,3,5-triallyl-1, 3,5-triazine-2,4,6(1H,3H,5H)-trione, 1,3,5,7-tetravinyl-1,3, 5,7-tetramethylcyclotetrasiloxane, 2,4,6-triallyloxy-1,3,5-triazine, 1,3,5-triacryloylhexahydro-1,3,5-triazine, 1,2-divinyl furoate, 1,3-butadiene carbonate, 1-vinylazetidin-2-one, 1-vinylaziridin-2-one, 1-vinylpiperidin-2-one, 1 vinylpyrrolidin-2-one, 2,4-divinyl-1,3-dioxane, 2-amino-3-vinylcyclohexanone, 2-amino-3-vinylcyclopropanone, 2 amino-4-vinylcyclobutanone, 2-amino-5-vinylcyclopentanone, 2-aryloxy-cyclopropanone, 2-vinyl-[1,2]oxazetidine, 2 vinylaminocyclohexanol, 2-vinylaminocyclopropanone, 2-vinyloxetane, 2-vinyloxy-cyclopropanone, 3-(N-vinylamino)cyclohexanone, 3,5-divinyl furoate, 3-vinylazetidin-2-one, 3 vinylaziridin-2-one, 3-vinylcyclobutanone, 3-vinylcyclopentanone, 3-vinyloxaziridine, 3-vinyloxetane, 3-vinylpyrrolidin-2-one, 2-vinyl-1,3-dioxolane, acrolein diethyl acetal, acrolein dimethyl acetal, 4,4- divinyl-3-dioxolan-2-one, 4-vinyltetrahydropyran, 5-vinylpiperidin-3-one, allylglycidyl ether, butadiene monoxide, butyl-vinyl-ether, dihydropyran-3-one, divinyl butyl carbonate, divinyl carbonate, divinyl crotonate, divinyl ether, divinyl ethylene carbonate, divinyl ethylene silicate, divinyl ethylene sulfate, divinyl ethylene sulfite, divinyl methoxypyrazine, divinyl methylphosphate, divinyl propylene carbonate, ethyl phosphate, methoxy-o-terphenyl, methyl phosphate, oxetan-2-yl-vinylamine, oxiranylvinylamine, vinyl carbonate, vinyl crotonate, vinyl cyclopentanone, vinyl ethyl-2-furoate, vinyl ethylene carbonate, vinyl ethylene silicate, vinyl ethylene sulfate, vinyl ethylene sulfite, vinyl methacrylate, vinyl phosphate, vinyl-2-furoate, vinylcylopropanone, vinylethylene oxide, β-vinyl-γ-butyrolactone or a mixture of any two or more thereof. In some embodiments, the additive may be a cyclotriphosphazene that is substituted with F, alkyloxy, alkenyloxy, aryloxy, methoxy, allyloxy groups or combinations thereof. For example, the additive may be a (divinyl)-(methoxy)(trifluoro)cyclotriphosphazene, (trivinyl)(difluoro)(methoxy)cyclotriphosphazene, (vinyl)(methoxy)(tetrafluoro)cyclotriphosphazene, (aryloxy)(tetrafluoro)(methoxy)cyclotriphosphazene or (diaryloxy)(trifluoro)(methoxy)cyclotriphosphazene compounds or a mixture of two or more such compounds.

In some embodiments the additive is a sulfur-containing compound, phosphorus-containing compound, boron-containing compound, silicon-containing compound, fluorine-containing compound, nitrogen-containing compound, compound containing at least one unsaturated carbon-carbon bond, carboxylic acid anhydride or the mixtures thereof. In some embodiments, the additive is vinyl carbonate, vinyl ethylene carbonate, or a mixture of any two or more such compounds. Further, the additive is present in a range of from 0.01% to 10% by weight.

In some embodiments the additive is a fully or partially halogenated phosphoric acid ester compound, an ionic liquid, or mixtures thereof. The halogenated phosphoric acid ester may include 4-fluorophenyldiphenylphosphate, 3,5-difluorophenyldiphenylphosphate, 4-chlorophenyldiphenylphosphate, trifluorophenylphosphtate, heptafluorobutyldiphenylphosphate, trifluoroethyldiphenylphosphate, bistrifluoroethylphenyl phosphate, phenylbis(trifluoroethyl) phosphate. The ionic liquids may include tris(N-ethyl-N-methylpyrrolidinium)thiophosphate bis(trifluoromethylsulfonyl)imide, tris(N-ethyl-N-methylpyrrolidinium) phosphate bis(trifluoromethylsulfonyl)imide, tris(N-ethyl-N-methylpiperidinium)thiophosphate bis(trifluoromethylsulfonyl)imide, tris(N-ethyl-N-methylpiperidinium)phosphate bis(trifluoromethylsulfonyl)imide, N-methyl-trimethyl silylpyrrolidinium bis(trifluoromethylsulfonyl) imide, N-methyl-trimethylsilylpyrrolidinium hexafluorophosphate. Further, the additive is present in a range of 0.01% to 10% by weight.

In another aspect of the disclosure, an electrochemical energy storage device is provided that includes a cathode, an anode and an electrolyte including an ionic liquid as described herein. In one embodiment, the electrochemical energy storage device is a lithium secondary battery. In some embodiments, the secondary battery is a lithium battery, a lithium-ion battery, a lithium-sulfur battery, a lithium-air battery, a sodium ion battery, or a magnesium battery. In some embodiments, the electrochemical energy storage device is an electrochemical cell, such as a capacitor. In some embodiments, the capacitor is an asymmetric capacitor or supercapacitor. In some embodiments, the electrochemical cell is a primary cell. In some embodiments, the primary cell is a lithium/$MnO_2$ battery or Li/poly (carbon monofluoride) battery.

In an embodiment, a secondary battery is provided including a positive and a negative electrode separated from each other using a porous separator and the electrolyte described herein.

Suitable cathodes include those such as, but not limited to, a lithium metal oxide, spinel, olivine, carbon-coated olivine, $LiFePO_4$, $LiCoO_2$, $LiNiO_2$, $LiMn_{0.5}Ni_{0.5}O_2$, $LiMn_{0.33}Co_{0.33}Ni_{0.33}O_2$, $LiMn_2O_4$, $LiFeO_2$, $LiNi_xCo_yMet_zO_2$, $An'B_2(XO_4)_3$ (NASICON), vanadium oxide, lithium peroxide, sulfur, polysulfide, a lithium carbon monofluoride (also known as LiCFx) or mixtures of any two or more thereof, where Met is Al, Mg, Ti, B, Ga, Si, Mn or Co; A is Li, Ag, Cu, Na, Mn, Fe, Co, Ni, Cu or Zn; B is Ti, V, Cr, Fe or Zr; X is P, S, Si, W or Mo; and wherein $0 \leq x \leq 0.3$, $0 \leq y \leq 0.5$, and $0 \leq z \leq 0.5$ and $0 \leq n^1 \leq 0.3$. According to some embodiments, the spinel is a spinel manganese oxide with the formula of $Li1+xMn2-zMet'''yO4-mX'n$, wherein Met''' is Al, Mg, Ti, B, Ga, Si, Ni or Co; X' is S or F; and wherein $0 \leq x \leq 0.3$, $0 \leq y \leq 0.5$, $0 \leq z \leq 0.5$, $0 \leq m \leq 0.5$ and $0 \leq n \leq 0.5$. In other embodiments, the olivine has a formula of $Li_{1+x}Fe_{1-z}Met''_yPO_4-mX'n$, wherein Met'' is Al, Mg, Ti, B, Ga, Si, Ni, Mn or Co; X' is S or F; and wherein $0 \leq x \leq 0.3$, $0 \leq y \leq 0.5$, $0 \leq z \leq 0.5$, $0 \leq m \leq 0.5$ and $0 \leq n \leq 0.5$.

Suitable anodes include those such as lithium metal, graphitic materials, amorphous carbon, carbon nanotubes, $Li_4Ti_5O_{12}$, tin alloys, silicon, silicon alloys, intermetallic compounds, or mixtures of any two or more such materials. Suitable graphitic materials include natural graphite, artificial graphite, graphitized meso-carbon microbeads (MCMB) and graphite fibers, as well as any amorphous carbon materials.

In some embodiments, the anode is a composite anode including active materials such as silicon, silicon alloys; and a conductive polymer coating around the active material particles. The plurality of active material may be silicon particles having a particle size of between about 1 nm and about 100 μm. Other active materials can include but are not limited to hard-carbon, graphite, tin, and germanium particles. The polymer can be cyclized using heat treatment at temperatures of from 200° C. to 400° C. and convert to a ladder compound by crosslinking polymer chains. Specific polymers include but are not limited to polyacrylonitrile (PAN) where the cyclization changes the nitrile bond (CN) to a double bond (C═N). Polymer binder forms elastic but robust films to allow for controlled fragmentation/pulverization of silicon particles within the binder matrix. Additionally, PAN matrix also provides a path for Li-ion mobility thus enhancing the conductivity of the composite anode. The resultant anode material can overcome expansion and conductivity challenges of silicon-based anodes, such as by providing binders that can prevent expansion of silicon particles and conductive additives to provide a path for Li-ion mobility. In some embodiments, the polymer is from about 10 wt. % to 40 wt. % of the anode composite material.

In some embodiments, the anode and cathode electrodes are separated from each other by a porous separator.

The separator for the lithium battery often is a microporous polymer film. Examples of polymers for forming films include polypropylene, polyethylene, nylon, cellulose, nitrocellulose, polysulfone, polyacrylonitrile, polyvinylidene fluoride, polybutene, or copolymers or blends of any two or more such polymers. In some instances, the separator is an electron beam-treated micro-porous polyolefin separator. The electron treatment can increase the deformation temperature of the separator and can accordingly enhance thermal stability at high temperatures. Additionally, or alternatively, the separator can be a shut-down separator. The shut-down separator can have a trigger temperature above about 130° C. to permit the electrochemical cells to operate at temperatures up to about 130° C.

Following are molecular structures of suitable silyl-based additives according to the present disclosure.

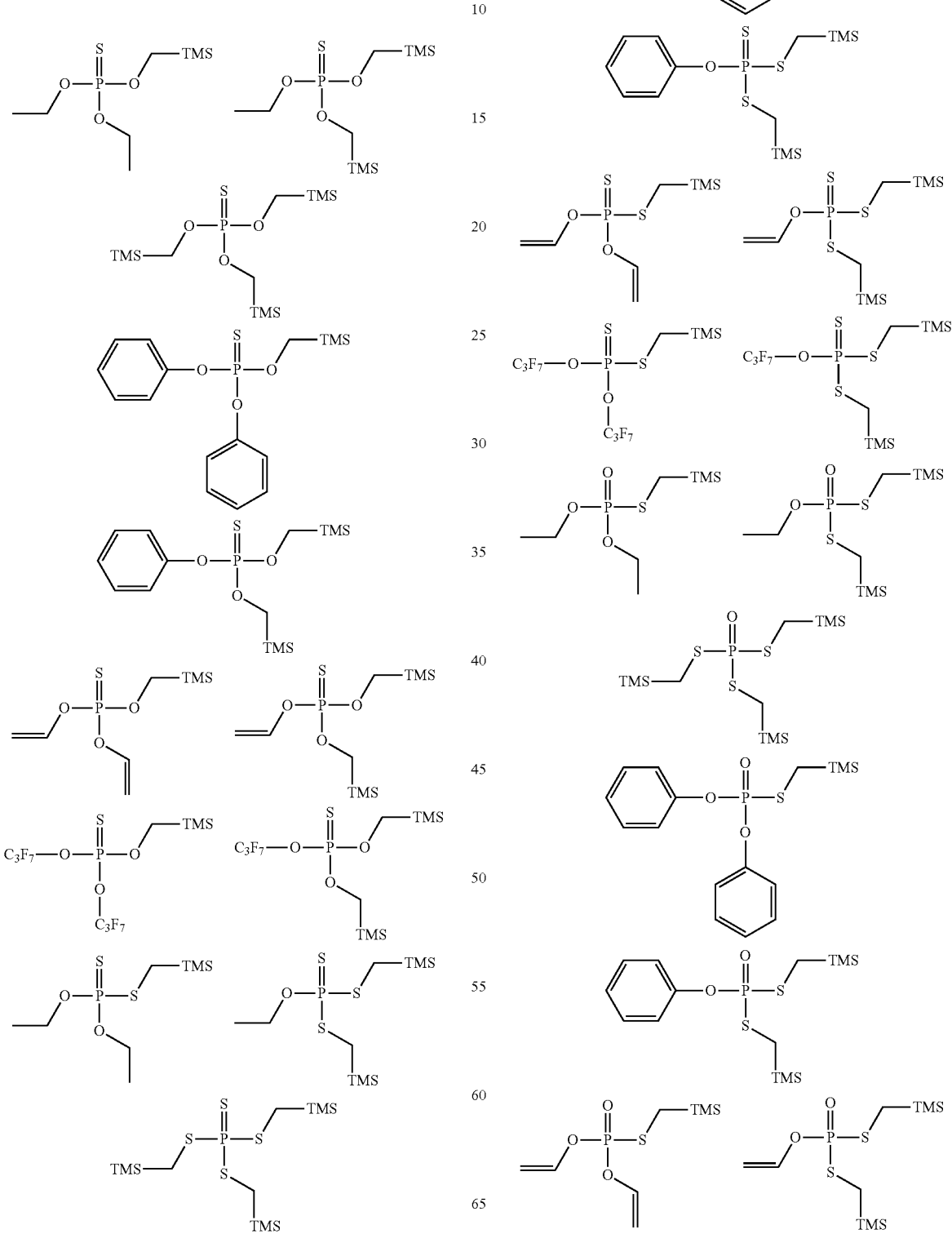

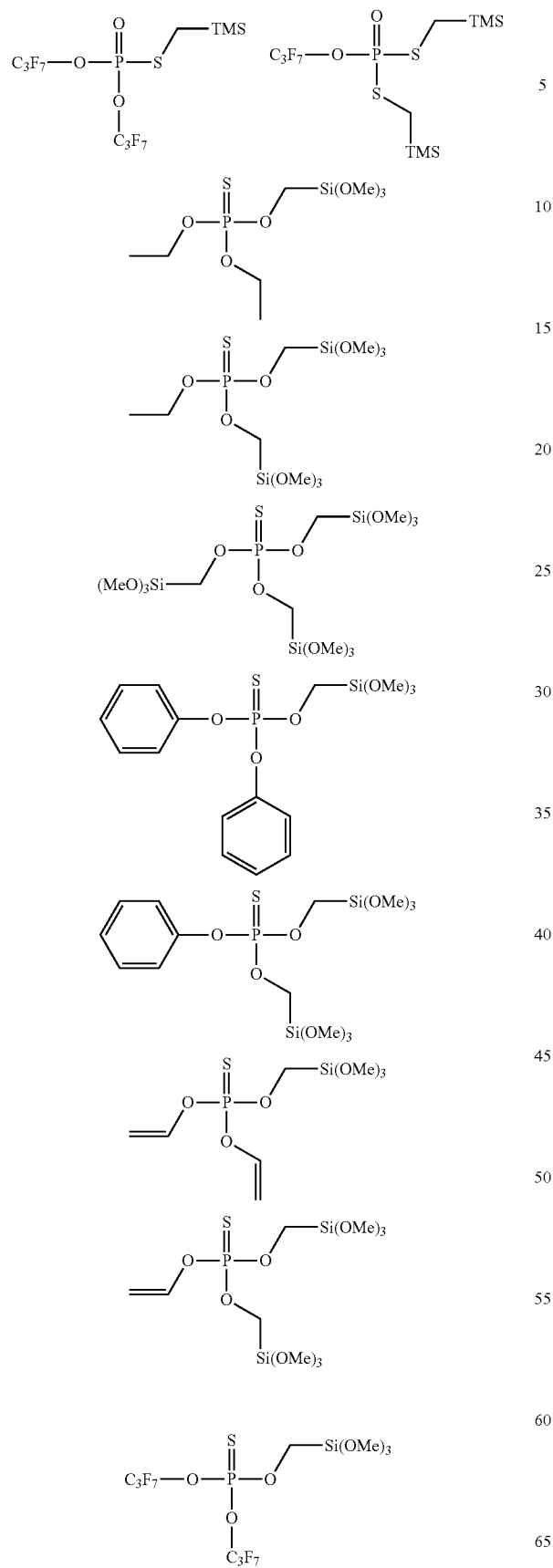
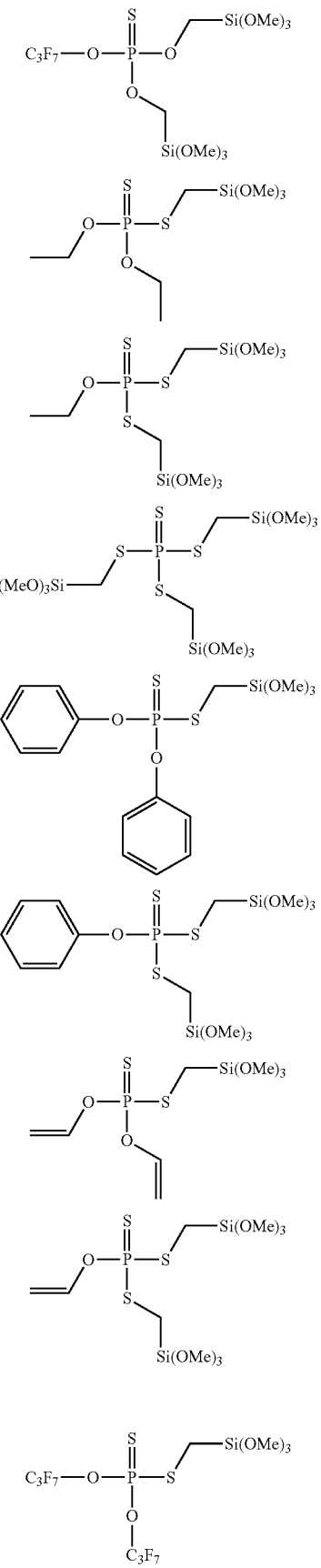

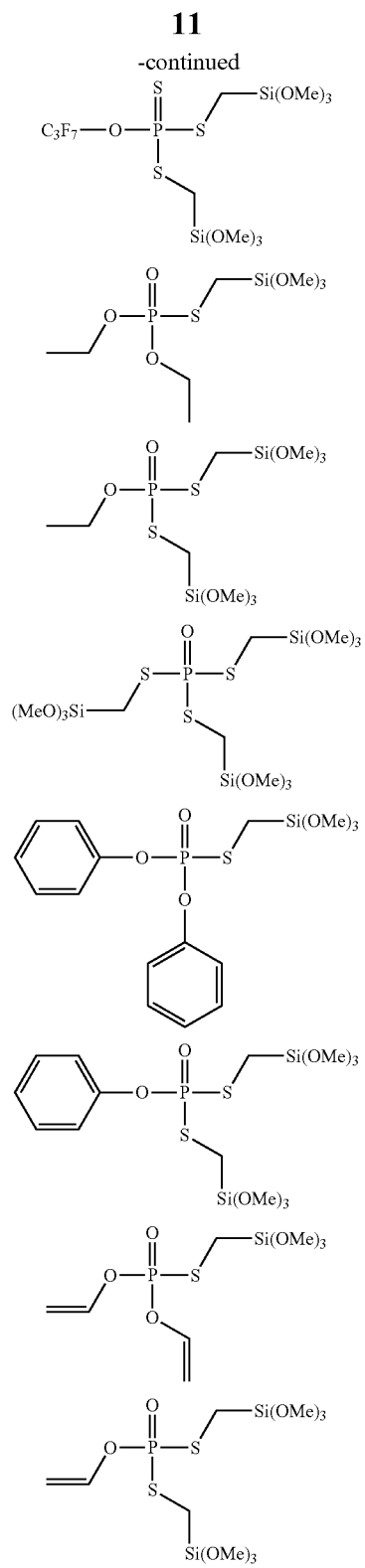

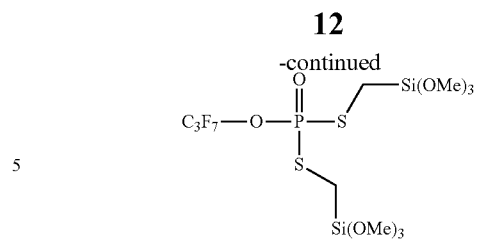

Further, the disclosure will illustrate specific examples. These examples are only an illustration and are not meant to limit the disclosure or the claims to follow.

Example 1

Synthesis of MethylmercaptoTMS-Diethylthiophosphate

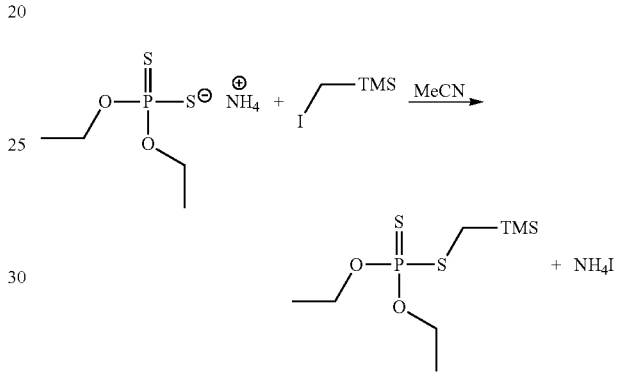

A 125 mL Erlenmeyer flask equipped with a magnetic stirrer was charged with 2.1 g of iodomethyl trimethylsilane (TMS). To this 30 mL of acetonitrile was added. The solution was then treated with 2 g of ammonium O, O' diethyl dithiophosphate. The solution was then heated to 65° C. for 2 h. During this time, a white solid came out of solution. The reaction process was monitored by TLC. The reaction was treated with a mixture of 50 mL of ethyl acetate and 40 mL of DI water. The reaction was stirred for a few minutes and then transferred to a separatory funnel. The organic phase was extracted into ethyl acetate three times. The aqueous layer was discarded, and the organic layer was dried with $MgSO_4$ and concentrated to dryness. Obtained 1.7 g of a clear oil.

$H^+$ NMR: (500 MHz, $CDCl_3$) δ ppm 4.10 (m, 4H), 2.00 (d, 2H), 1.32 (t, 6H), 0.079 (s, 9H); $P^{31}$ NMR: (500 MHz, $CDCl_3$) δ ppm 96.72 (s, 1P). FTIR: 2980.74, 2956.11; 1250.01; 1010.55; 950.76; 841.12; 658.05, 645.53; 517.89 $cm^{-1}$.

Example 2

Synthesis of Tris (TMS-ethyl) thiophosphate

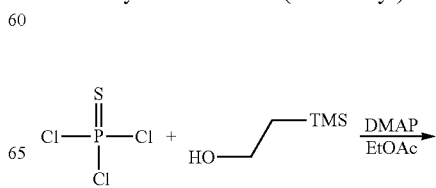

-continued

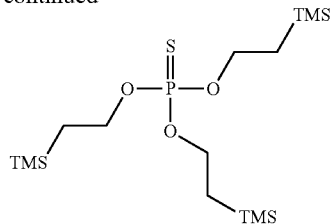

A 250 mL round bottom flask equipped with a magnetic stirrer, reflux condenser, addition funnel and nitrogen inlet were charged with 5.2 g of trimethylsilylethanol followed by 60 mL of ethyl acetate. To the stirred solution, 5.6 g of DMAP was added. Stirred and cooled to about 20° C. Thiophosphoryl chloride in 15 mL of ethyl acetate was added dropwise keeping the temperature under 25° C. During addition, a white solid precipitated almost immediately. After addition, the cooling bath was removed, and the reaction mixture was stirred for 1 h. The reaction process was monitored by TLC. The slurry was treated with 60 mL of 5% HCl solution. Transferred to a separatory funnel and extracted into ethyl acetate three times. The organic layer was collected, dried with $MgSO_4$, and filtered. The solvent was removed under reduced pressure on the Roto Evaporator. Obtained 3.3 g of a clear oil.

FTIR: 2954.04; 1740.45; 1248.22; 831.48; 760.06; 692.36 $cm^{-1}$.

Example 3

Electrolyte Formulations

Electrolyte formulations were prepared in a dry argon filled glovebox by combining all electrolyte components in glass vials by stirring for 24 hours to ensure complete dissolution of all solids. The silyl-based additive materials are added to a base electrolyte formulation comprising a 3:7 by volume mixture of ethylene carbonate, "EC", ethyl methyl carbonate, "EMC", and 1 M lithium hexafluorophosphate, "LiPF6", as a $Li^+$ ion conducting salt, dissolved therein. Vinylene carbonate (VC) and fluoroethylene carbonate (FEC) are used as standard anode SEI forming additives, and trimethylsilyl phosphite (TMSPi) is a comparative example of a silyl-based molecule. The electrolyte formulations are listed in Table A.

TABLE A

Electrolyte Formulations

| Electrolyte | Base Formulation | Additive Weight (%) |
| --- | --- | --- |
| Comparative Example 1 (CE1) | 1.0M $LiPF_6$ in EC:EMC (3:7) | VC: 1%, FEC: 1% |
| Comparative Example 2 (CE2) | 1.0M $LiPF_6$ in EC:EMC (3:7) | VC: 1%, FEC: 1%, TMSPi: 1% |
| Embodiment Example 1 (EE1) | 1.0M $LiPF_6$ in EC:EMC (3:7) | VC: 1%, FEC: 1%, Example A: 1% |
| Embodiment Example 2 (EE2) | 1.0M $LiPF_6$ in EC:EMC (3:7) | VC: 1%, FEC: 1%, Example B: 1% |

Example 4

Li-ion Cell Data

The electrolyte formulations prepared are used as electrolytes in 200 mAh Li-ion pouch cells comprising lithium nickel manganese cobalt oxide (NMC622) cathode active material and graphite as the anode active material. In each cell, 0.9 mL of electrolyte formulation was added and allowed to soak in the cell for 1 hour. The cells are vacuum sealed, and primary charged before wetting at 25° C. for 10 hours. The cells were then charged to 3.8 V at C/25 rate before degassing, followed by vacuum sealing. After degassing, the cells were charged and discharged twice between 4.45 to 3.0 V at C/10 rate, and the results are summarized in Table B. The Initial Capacity Loss (iCL) is calculated based on the first cycle Coulombic Efficiency (CE), and the reported discharge capacity is for the last cycle of formation at C/5 rate. AC-IR is the measured internal resistance at 1 kHz frequency. It is evident that the addition of 1 wt. % silyl-based additive increases the AC-IR, and hence reduced the initial discharge capacity compared to comparative example 1. However, the dQ/dV profiles in FIG. 1 are indicative of a different unique SEI layer on the anode surface compared to Comparative examples. The dQ/dV profile for CE2 with TMSPi shows a unique sharp reaction peak at 2.95 V, which is absent in cells with other electrolytes. This can also be corelated to the highest AC-IR value for cells with CE2 electrolyte.

TABLE B

Initial Cell Data

| Electrolyte | Initial Capacity Loss (%) | Discharge Capacity (mAh) | AC-IR (mΩ) |
| --- | --- | --- | --- |
| CE1 | 12.6 | 203.5 | 97.5 |
| CE2 | 14.3 | 199.0 | 122.3 |
| EE1 | 14.5 | 194.9 | 105.6 |
| EE2 | 13.7 | 201.7 | 100.5 |

Figure 2:
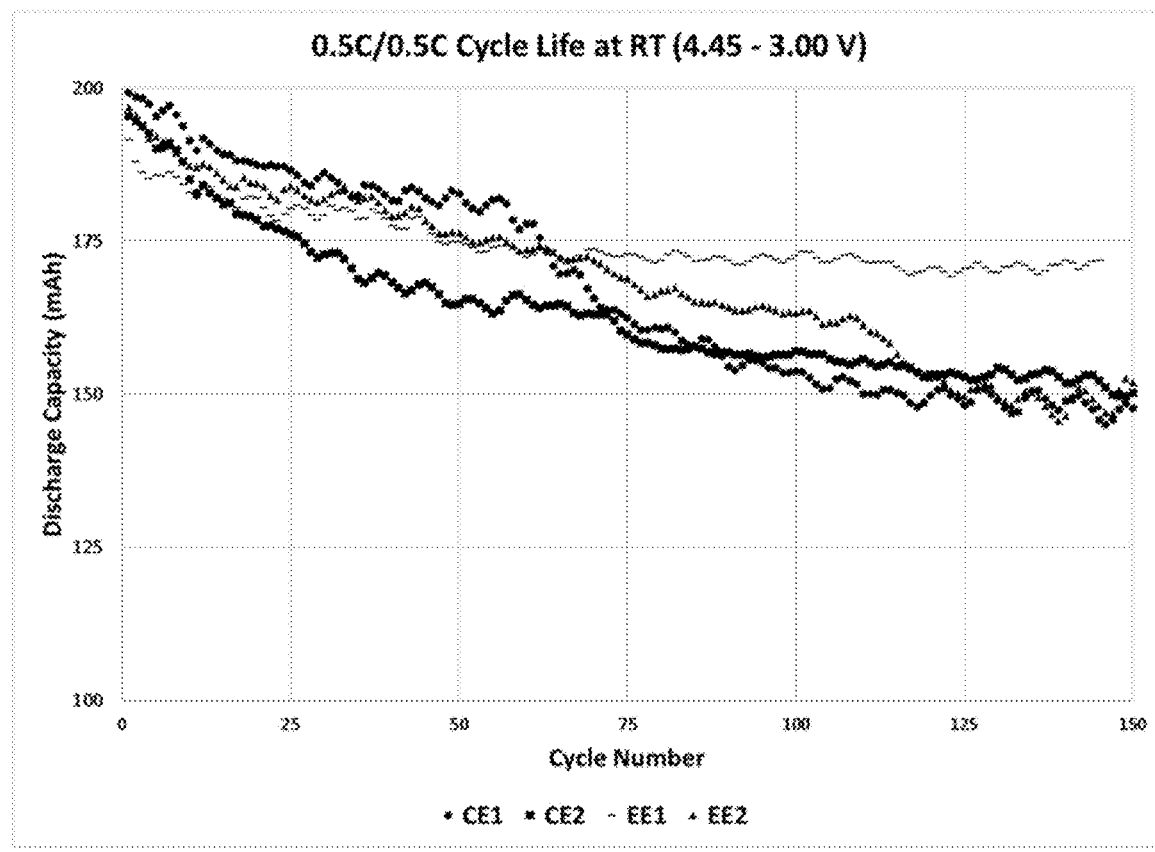
FIG. 2 shows the cycle life characteristics at room temperature for cells with electrolytes tested in 200 mAh NMC622-Gr cells.
Figure 3:
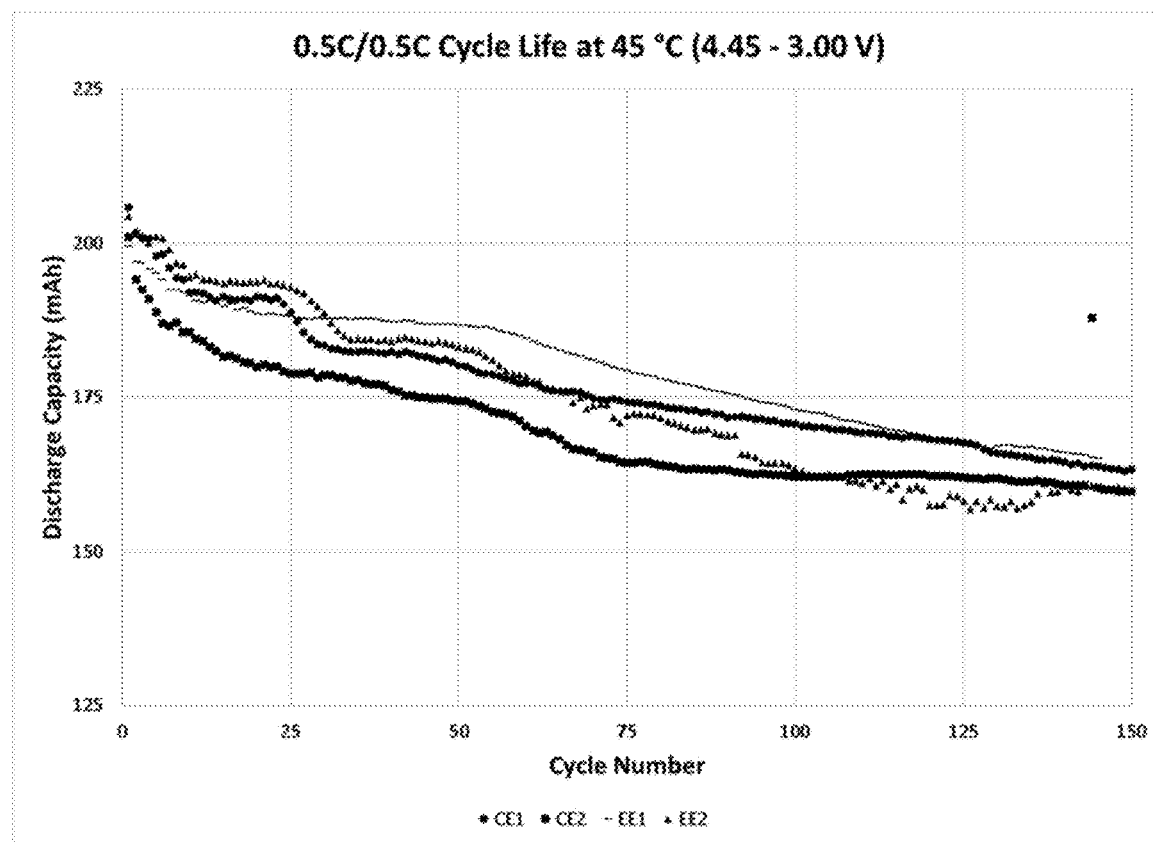
FIG. 3 shows the cycle life characteristics at 45° C. for cells with electrolytes tested in 200 mAh NMC622-Gr cells.

The cycle life characteristics are tested at 0.5 C charging and discharging rate in the voltage range of 4.45-3.0 V. In the cycle life plots in FIGS. 2 and 3, cells with embodiment Example 1 electrolyte (EE1) perform better at room temperature and 45° C., compared to commercial examples. The capacity retention data can be seen in Table C.

TABLE C

Capacity Retention Data after 125 cycles

| | Temperature | |
| --- | --- | --- |
| Electrolyte | RT | 45° C. |
| CE1 | 74.9 | 81.4 |
| CE2 | 78.2 | 80.6 |
| EE1 | 88.6 | 84.0 |
| EE2 | 76.2 | 77.3 |

Although various embodiments have been depicted and described in detail herein, it will be apparent to those skilled in the relevant art that various modifications, additions, substitutions, and the like can be made without departing from the spirit of the disclosure and these are therefore considered to be within the scope of the disclosure as defined in the claims which follow.

What is claimed is:
1. An electrochemical energy storage device electrolyte comprising:
 an aprotic organic solvent system;
 a metal salt; and at least one silyl-based compound additive according to the formula:

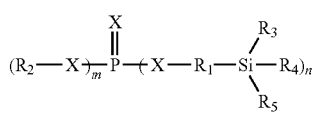

wherein:
X is independently oxygen or sulfur; wherein at least one X is sulfur;
m and n are either 0, 1, 2 or 3; wherein m and n must sum equal to 3;
$R_1$ and $R_2$ are independently $C_1$-$C_{12}$ substituted or unsubstituted alkyl groups, or $C_6$-$C_{14}$ aryl groups;
wherein the hydrogen atoms can be unsubstituted or can be a halogen, alkyl, alkoxy, perfluorinated alkyl, silyl, siloxy, silane, sulfoxide, amide, azo, ether, and thioether group or combinations thereof; and
$R_3$, $R_4$, $R_5$ are independently selected from hydrogen, $C_1$-$C_{12}$ alkyl groups, heteroalkyl groups, perfluoroalkyl groups, alkenyl groups, phenyl or alkoxy groups.

2. The electrolyte of claim 1, wherein the at least one silyl-based compound additive comprises at least one compound selected from tris(trimethylsilyl)thiophosphate, diethyl (trimethylsilyl)thiophosphate, diethyl(trimethylsilyl) dithiophosphate, and mixtures thereof.

3. The electrolyte of claim 1, wherein the at least one silyl-based compound additive is present in a concentration of from 0.01 wt. % to 10 wt. % in the electrolyte.

4. The electrolyte of claim 1, wherein the aprotic organic solvent system comprises an open-chain or cyclic carbonate, carboxylic acid ester, nitrite, ether, sulfone, ketone, lactone, dioxolane, glyme, crown ether, siloxane, phosphoric acid ester, phosphite, mono- or polyphosphazene or mixtures thereof.

5. The electrolyte of claim 1, wherein the aprotic organic solvent system is present in a concentration of from 60 wt. % to 90 wt. % in the electrolyte.

6. The electrolyte of claim 1, wherein the cation of the metal salt is an alkali metal.

7. The electrolyte of claim 6, wherein the alkali metal is lithium or sodium.

8. The electrolyte of claim 1, wherein the cation of the metal salt is aluminum or magnesium.

9. The electrolyte of claim 1, wherein the metal salt is present in a concentration of from 10 wt. % to 30 wt. % in the electrolyte.

10. The electrolyte of claim 1, further comprising at least one additional additive.

11. The electrolyte of claim 10, wherein the additional additive comprises a sulfur-containing compound, phosphorus-containing compound, boron-containing compound, silicon-containing compound, fluorine-containing compound, nitrogen-containing compound, compound containing at least one unsaturated carbon-carbon bond, carboxylic acid anhydride or the mixtures thereof.

12. The electrolyte of claim 10, wherein the additional additive comprises a partially or fully halogenated phosphoric acid ester compound, an ionic liquid, or mixtures thereof.

13. The electrolyte of claim 12, wherein the halogenated phosphoric acid ester compounds consist of 4-fluorophenyldiphenylphosphate, 3,5-difluorophenyldiphenylphosphate, 4-chlorophenyldiphenylphosphate, trifluorophenylphosphate, heptafluorobutyldiphenylphosphate, trifluoroethyldiphenylphosphate, bistrifluoroethylphenyl phosphate, phenylbis(trifluoroethyl)phosphate.

14. The electrolyte of claim 12, wherein the ionic liquid consists of tris(N-ethyl-N-methylpyrrolidinium)thiophosphate bis(trifluoromethylsulfonyl)imide, tris(N-ethyl-N-methylpyrrolidinium) phosphate bis(trifluoromethylsulfonyl)imide, tris(N-ethyl-N-methylpiperidinium) thiophosphate bis(trifluoromethylsulfonyl)imide, tris(N-ethyl-N-methylpiperidinium)phosphate bis (trifluoromethylsulfonyl)imide.

15. The electrolyte of claim 10, wherein the additional additive is present in a concentration of from 0.01 wt. % to 10 wt. % in the electrolyte.

16. An electrochemical energy storage device comprising:
a cathode;
an anode;
an electrolyte according to claim 1; and
a separator.

17. The device of claim 16, wherein the cathode comprises a lithium metal oxide, spinel, olivine, carbon-coated olivine, vanadium oxide, lithium peroxide, sulfur, polysulfide, a lithium carbon monofluoride or mixtures of any two or more thereof.

18. The device of claim 17, wherein the lithium metal oxide is $LiCoO_2$, $LiNiO_2$, $LiMn_{0.5}Ni_{0.5}O_2$, $LiMn_{0.1}Co_{0.1}Ni_{0.8}O_2$, $LiMn_{0.2}Co_{0.2}Ni_{0.6}O_2$, $LiMn_{0.3}Co_{0.2}Ni_{0.5}O_2$, $LiMn_{0.33}Co_{0.33}Ni_{0.33}O_2$, $LiMn_2O_4$, $LiFeO_2$, $A_{n'}B_2(XO_4)_3$ (NASICON), wherein A is Li, Ag, Cu, Na, Mn, Fe, Co, Ni, Cu or Zn; B is Ti, V, Cr, Fe or Zr; X is P, S, Si, W or Mo; and wherein $0<n'<3$.

19. The device of claim 16, wherein the anode comprises lithium metal, graphitic material, amorphous carbon, $Li_4Ti_5O_{12}$, tin alloy, silicon, silicon alloy, intermetallic compound, or mixtures thereof.

20. The device of claim 16, wherein the anode is a composite anode comprising active material silicon or silicon alloy and a conductive polymer coating around the active material.

21. The device of claim 16, wherein the conductive polymer is polyacrylonitrile (PAN).

22. The device of claim 16, wherein the device comprises a lithium battery, lithium-ion battery, lithium-sulfur battery, lithium-air battery, sodium ion battery, magnesium battery, lithium/MnO2 battery, or Li/poly(carbon monofluoride) battery.

23. The device of claim 16, wherein the device comprises a capacitor.

24. The device of claim 16, wherein the device comprises an electrochemical cell.

25. The device of claim 16, wherein the separator comprises a porous separator separating the anode and cathode from each other.

26. The device of claim 23, wherein the porous separator comprises an electron beam-treated micro-porous polyolefin separator or a microporous polymer film comprising nylon, cellulose, nitrocellulose, polysulfone, polyacrylonitrile, polyvinylidene fluoride, polypropylene, polyethylene, polybutene, or co-polymers or blends of any two or more such polymers.

27. The device of claim 16, wherein the aprotic organic solvent system comprises an open-chain or cyclic carbonate, carboxylic acid ester, nitrite, ether, sulfone, ketone, lactone, dioxolane, glyme, crown ether, siloxane, phosphoric acid ester, phosphite, mono- or polyphosphazene or mixtures thereof.

28. The device of claim 16, wherein the aprotic organic solvent system is present in a concentration of from 60 wt. % to 90 wt. % in the electrolyte.

29. The device of claim 16, wherein the cation of the metal salt is an alkali metal.

30. The device of claim 27, wherein the alkali metal is lithium or sodium.

31. The device of claim 16, wherein the cation of the metal salt is aluminum or magnesium.

32. The device of claim 16, wherein the metal salt is present in a concentration of from 10 wt. % to 30 wt. % in the electrolyte.

33. The device of claim 16, wherein the electrolyte further comprises at least one additional additive.

34. The device of claim 31, wherein the additional additive comprises a sulfur-containing compound, phosphorus-containing compound, boron-containing compound, silicon-containing compound, fluorine-containing compound, nitrogen-containing compound, compound containing at least one unsaturated carbon-carbon bond, carboxylic acid anhydride or the mixtures thereof.

35. The device of claim 31, wherein the additional additive comprises a partially or fully halogenated phosphoric acid ester compound, an ionic liquid, or mixtures thereof.

36. The device of claim 33, wherein the halogenated phosphoric acid ester compound is 4-fluorophenyldiphenylphosphate, 3,5-difluorophenyldiphenylphosphate, 4-chlorophenyldiphenylphosphate, trifluorophenylphosphate, heptafluorobutyldiphenylphosphate, trifluoroethyldiphenylphosphate, bistrifluoroethylphenyl phosphate, or phenylbis(trifluoroethyl)phosphate.

37. The device of claim 33, wherein the ionic liquid is tris(N-ethyl-N-methylpyrrolidinium)thiophosphate bis(trifluoromethylsulfonyl)imide, tris(N-ethyl-N-methylpyrrolidinium) phosphate bis(trifluoromethylsulfonyl)imide, tris(N-ethyl-N-methylpiperidinium)thiophosphate bis(trifluoromethylsulfonyl)imide, tris(N-ethyl-N-methylpiperidinium)phosphate bis(trifluoromethylsulfonyl)imide, N-methyl-trimethyl silylpyrrolidinium bis(trifluoromethylsulfonyl)imide, or N-methyl-trimethyl silylpyrrolidinium hexafluorophosphate.

38. The device of claim 31, wherein the additional additive is present in a concentration of from 0.01 wt. % to 10 wt. % in the electrolyte.

* * * * *